United States Patent [19]
Toshihiko

[11] Patent Number: 5,867,551
[45] Date of Patent: Feb. 2, 1999

[54] NUCLEAR FUEL ASSEMBLY FOR PRESSURIZED WATER REACTOR

[75] Inventor: Motomura Toshihiko, Kishiwada, Japan

[73] Assignee: Nuclear Fuel Industries, Ltd., Tokyo, Japan

[21] Appl. No.: 928,354

[22] Filed: Sep. 12, 1997

[30] Foreign Application Priority Data

Sep. 13, 1996 [JP] Japan .................................... 8-265369

[51] Int. Cl.$^6$ .............................. G21C 3/30; G21C 15/00; G21C 19/30
[52] U.S. Cl. ........................... 376/352; 376/313; 376/443
[58] Field of Search .................................... 376/352, 313, 376/443, 439, 440, 446, 462

[56] References Cited

U.S. PATENT DOCUMENTS

| | | | |
|---|---|---|---|
| 4,684,495 | 8/1987 | Wilson et al. | 376/352 |
| 4,684,496 | 8/1987 | Wilson et al. | 376/352 |
| 4,900,507 | 2/1990 | Shallenberger et al. | 376/352 |
| 5,345,483 | 9/1994 | Johansson et al. | 376/313 |
| 5,528,640 | 6/1996 | Johansson et al. | 376/313 |

FOREIGN PATENT DOCUMENTS 08-313667   11/1996   Japan .

Primary Examiner—Charles T. Jordan
Assistant Examiner—M. J. Lattig
Attorney, Agent, or Firm—Flynn, Thiel, Boutell & Tanis, P.C.

[57] ABSTRACT

A nuclear fuel assembly for use in a pressurized water reactor comprising a top nozzle and a bottom nozzle, fuel rods loaded and supported by grids in cells thereof and interconnected between a lowermost grid and the top nozzle, and a filter member interposed between the lowermost grid and the bottom nozzle. To prevent the intrusion of foreign matters such as linear ones in cooling water under flow into the fuel assembly, the filter member is configured to have upward conical protruding portions and downward conical protruding portions below the fuel rods and below a crossing corner area of walls of the grid cells, respectively, so that the upward protruding portions may be defined therein each with four through-holes for flowing water, thus forming a curved crisscross solid face in a vertically projected shadow zone of the fule rod whereas the downward protruding portions may be defined therein each with a through-hole of a curved crisscross form for flowing water in a vertically projected shadow zone of the crossing corner area of the cell walls. Because of the construction, a total projected area of the through-holes over a lower core plate is nearly zero.

7 Claims, 6 Drawing Sheets

NUCLEAR FUEL ASSEMBLY FOR PRESSURIZED WATER REACTOR

BACKGROUND OF THE INVENTION

1. Field of the Invention

This invention relates to a nuclear fuel assembly designed for use in a puressurized water reactor (PWR), which assembly is fitted with a filter member on a bottom nozzle thereof in order to avoid damage of fuel rods due to foreign matters which intrude into the passageway of a primary cooling water.

2. Description of Related Art

A nuclear fuel assembly for use in a PWR is, as well known, composed of a top nozzle and a bottom nozzle; a plurality of fuel rods, and control-rod guide thimble tubes and an instrumentation tube arranged in a transversely spaced relation to extend vertically between the top and bottom nozzles, thus forming a fuel bundle or cluster, the thimble tubes and the instrumentation tube being interconnected rigidly between the top and bottom nozzles; and grids supporting and inserting the fuel bundle in cells thereof and axially spaced apart from one another.

With such a conventional fuel assembly, a typical bottom nozzle is illustrated in FIG. 6 at 30 and constructed of a quadrangle plate body 31 defined with a plurality of threaded bores 33 for fixedly inserting therein the thimble tubes as a skeleton element of the fuel assembly and a multitude of through-holes 34 for flowing water, and four legs 32 vertically extending from the plate body 31 at its corner parts and supporting the plate body 31 at a predetermined distance spaced apart from a lower core plate 40.

In a PWR including the aforesaid fuel assemblies, a primary cooling water is routed from through-holes (not shown) apertured in the lower core plate 40 into the bottom nozzle 30, past the through-holes 34 and then through the fuel assembly, via the interstices between the grids and fuel rods to reach the top nozzle. The cooling water thus having passed through through-holes of the top nozzle is then flowed through a steam generator to reach the lower core plate 40, whereby a cycle of circulation of flowing water through the PWR is performed.

Here, foreign matters such as metal pieces are mingled within the the cooling water system and often get caught between the the fuel rods after passing through the bottom nozzle in its through-holes. The foreign objects thus caught may be vibrated by reason of the current of the cooling water and are likely to damage the fuel rods.

In order to cope with the foreign objects, heretofore, various attempts to improve the trapping capability of the bottom nozzle or the lowermost grid have beem made with a view toward avoiding the entrance of the foreign objects into the fuel assembly.

The improvement of the bottom nozzle in the trapping capability was carried out by reducing the diameter of the through-holes, apertured in the bottom nozzle, for flowing water, or by fitting the bottom nozzle with a filter member. A problem with these approaches, however, is that they entail an increase in the pressure loss of the fuel assembly, and consequently, there was a limitation in diminishing the hole diameter of the through-holes or the mesh diameter of the filter member. Hence, it was difficult to impede the intrusion of such foreign objects that have a smaller cross-section than the size of a projected shadow of the through-holes over a lower core plate.

On the other hand, the improvement of the lowermost grid was conducted by lowering the position of the grid down to a position coming into contact with the top face of the bottom nozzle, or by attaching dimples for trapping foreign objects within the grid cells. The lowered installation of the lowermost grid is designed for dividing the through-holes in the bottom nozzle by the grid straps thereby to impede the intrusion of further foreign objects of a much smaller cross-section into the fuel assembly.

However, these prior art countermeasures against foreign objects have been proved to have little impeding effect on the aforesaid foreign objects that have a smaller cross-section than a maximum projected shadow dimension of the through-holes. More specifically, when flowing water test with a water containing foreign objects was conducted and the bottom nozzle was observed, the prior art measures were effective for foreign objects with a diameter of at least 4 mm in minimum cross-section, but nearly of no use for linear foreign objects with a diameter of 2 mm and downward, e.g. wires having a smaller cross-section.

SUMMARY OF THE INVENTION

Accordingly, it is a primary object of the invention to provide a fuel assembly with a filter member of such a new through-hole construction on the bottom nozzle thereof that enables to minimize the projected shadow area of the through-holes over a lower core plate to be located beneath the fuel assembly, or even to reduce to approximately zero, and simultaneously to control the posture of foreign objects under flow, thereby improving vastly the obstructing effect of foreign objects.

Further object of the invention is to enable to use a bottom nozzle improved to have a larger passage flow area without any increase in the puressure loss, in combination with the aforementioned filter member.

The invention for attaining the foregoing objects resides broadly in a fuel assembly for use in a PWR comprising a top nozzle and a bottom nozzle; grids, axially spaced apart from one another, for supporing a fuel cluster in cells thereof in a transversely spaced relationship; a plurality of nuclear fuel rods interposed between the top nozzle and a lowermost grid, and thimble tubes and an instrumentation tube both of which are disposed at specified locations of the grid cells and interconnect rigidly the top and bottom nozzles, thus constituting the fuel clulster; and a filter member of a thin-gauge profiled hollow sheet interposed between the bottom nozzle and the lowermost grid in a manner abutting to the lowermost grid. And the fuel assembly is characterized in that the filter member is configured to have a plurality of upward protruding portions whose peaks extend up to the lowermost grid and a plurality of downward protruding portions whose peaks extend downwardly to the bottom nozzle, the upward protruding portions and the downward protruding portions being arranged alternately in sequence relative to diagonal line directions of the filter member so that the upward protruding portions may be located below the fuel rods and the downward protruding portions may be located below a crossing corner area of walls of the grid cells, the upward protruding portions each defining four through-holes for flowing water in a vertically projected shadow zone of the fuel rod, thereby assuming a curved crisscross contour; the downward protruding portions each defining such a through-hole for flowing water in a vertically projected shadow zone of the crossing corner area of the grid cell walls that assumes a curved crisscross contour.

In a preferred embodiment of the filter member, it is possible to configure the upward protruding portions to assume a rotation symmetrical form relative to a central axis of the fuel rods located above and to have an outside diameter nearly equal to the diameter of the fuel rod.

Further, in a preferred embodiment of the fuel assembly, the bottom nozzle is constructed of a plate body having a low pressure loss such that is comprised of an outer frame of the plate body, bosses for inserting the thimble tubes therein and a central boss for inserting the instrumentation tube therein, ribs interconnecting both bosses, and openings, as a through-hole for flowing water, surrounded by the ribs, bosses and outer frame. Here, it is possible to form the inside face of the outer frame as a slanted face having a thickness diminishing toward its lower part.

According to the fuel assembly thus constructed above, the filter member is formed so that the total projected area of both the through-holes for flowing water of the upward and downward protruding portions over the subjacent lower core plate may approximate substantially to zero because of the fact that the flowing-water holes and the fuel rods or the grid plate located above are in a vertically superposed position relation. As a consequence, it is possible to control the posture of foreign objects, thereby to attain a great blocking effect against them.

Further, the profiled configuration of the filter member comprised of the upward and downward protruding portions and the flowing water holes apertured in the protruding portions makes it possible to increase the total area of the flowing water holes owing to the exploitation of the side wall structure of the protruding portions, notwithstanding its approximately zero projected area to foreign objects. Thus, it is possible to accord a larger passage area to the bottom nozzle than that of the prior art bottom nozzle as mentioned above, thereby preventing any increase in the pressure loss.

BRIEF DESCRIPTION OF THE DRAWINGS

The invention will be hereinbelow described in more detail with reference to the accompanying drawings, in which.

DESCRIPTION OF THE PREFERRED EMBODIMENTS

Figure 1:
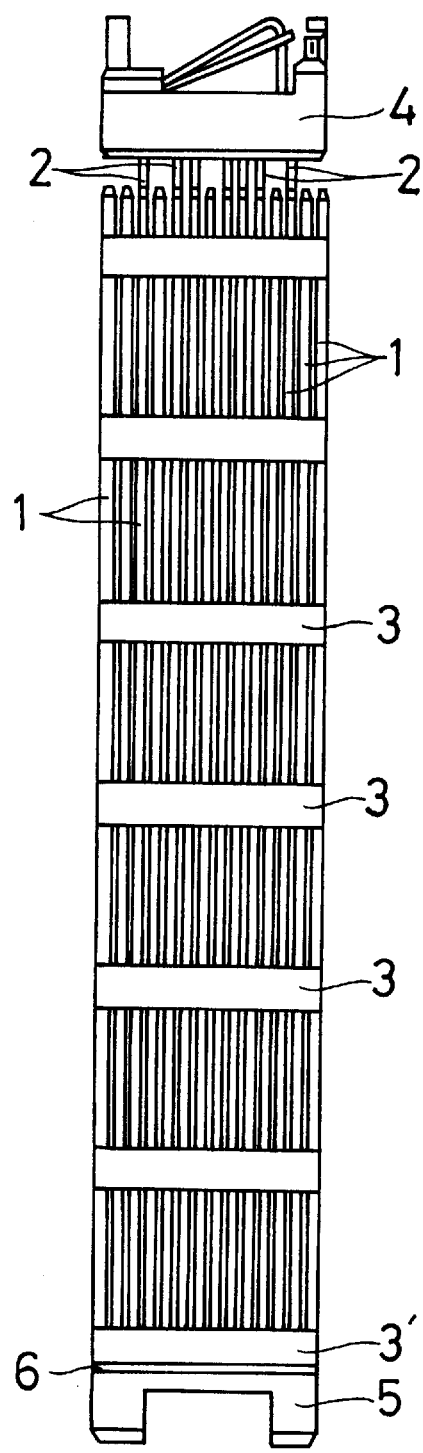
FIG. 1 is a schematic elevational view of a fuel assembly designed for use in a PWR.

According to this invention, the fuel assembly for PWR is, as illustrated in FIG. 1, composed of a multiplicity of fuel rods 1, thimble tubes and an instrumentation tube 2 (the latter is invisible from the front elevational side) forming a fuel cluster and supported by a plurality of grids 3 in a transversely spaced relation; and a top nozzle 4 and a bottom nozzle 5 anchoring the fuel cluster 1,2 therebetween.

Figure 3:
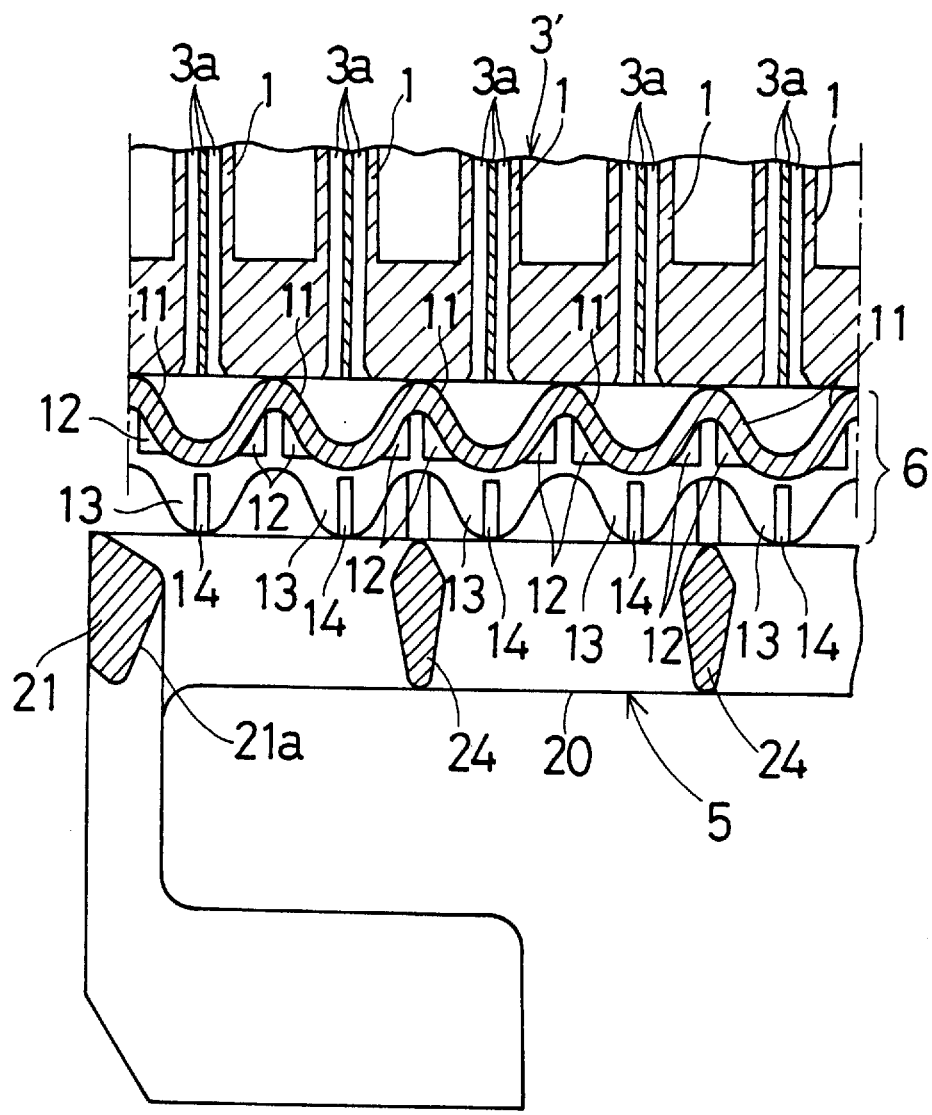
FIG. 3 is a fragmentary sectional view of the filter member taken along III—III line of FIG. 2 showing additionally upper and lower vicinities thereof.

The fuel assembly is further fitted with a filter member 6 of a thin-gauge profiled hollow sheet between a plate body 20 of the bottom nozzle 5 and the fuel rods 1 so as to abut against a lowermost grid 3' as shown in FIG. 3.

Figure 2:
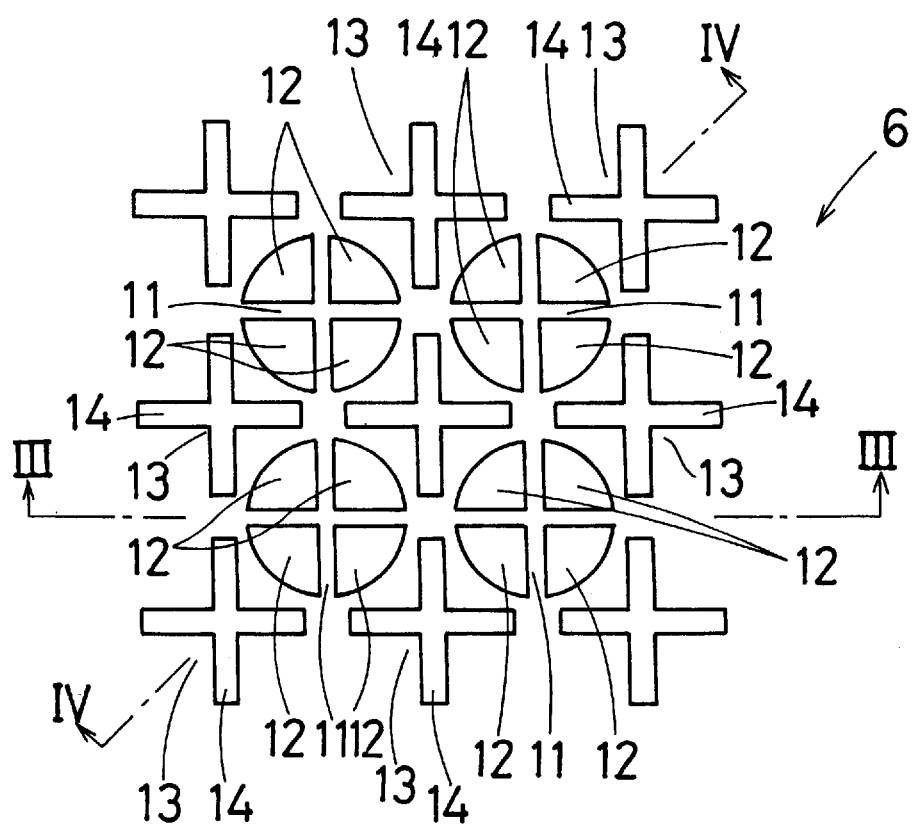
FIG. 2 is a fragmentary enlarged illustration of one example of a filter member used for the fuel assembly according to this invention showing its essential part only as viewed in top plan.
Figure 4:
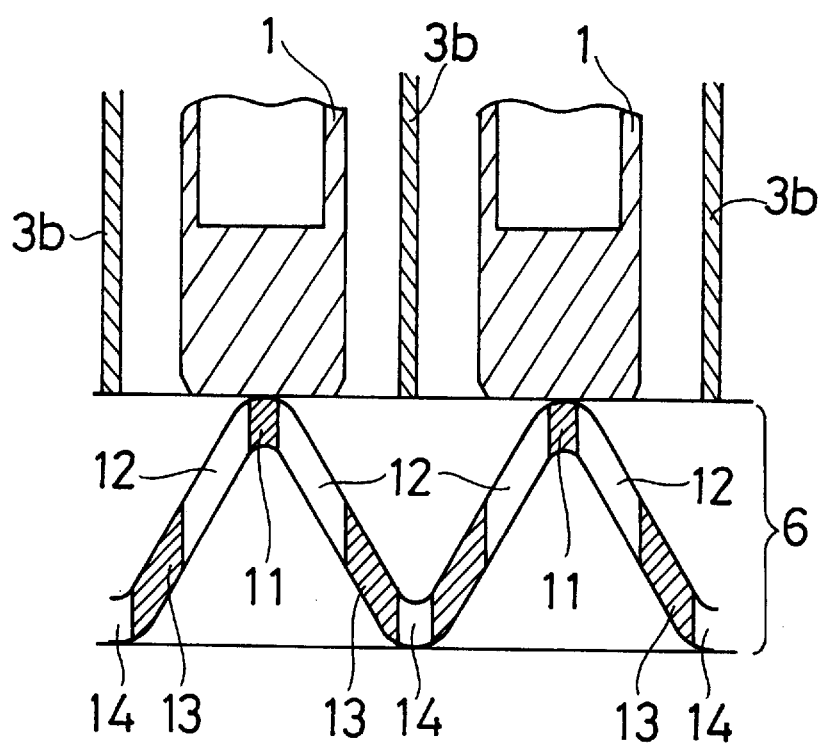
FIG. 4 is a fragmentary sectional view of the filter member taken along IV—IV line of FIG. 2 showing additionally an upper vicinity of the filter member.

The filter member 6 is, as illustrated in FIGS. 2 to 4, configured to have a multiplicity of upward protruding portions 11 with a peak extending up to the lowermost grid 3' at a vertically lower position of each fuel rod 1 and a multiplicity of downward protruding portions 13 with a peak extending downwardly to the bottom nozzle 5 at a vertically lower position from a crossing corner area of cell walls 3a of each grid 3 centered at 3b.

The upward protruding portions 11 assume a conical contour concentrical with the fuel rod 1 and are possessed of a nearly equal outside diameter to the fuel rod 1 whereas the downward protruding portions 13 assume a reverse conical contour of a slightly smaller size than the upward protruding portions 11 so that their peaks may be located vertically below the center 3b of the crossing corner area of grid cell walls 3a.

By configuring the upward and downward protruding portions 11, 13 in respective rotation symmetrical forms in this manner, deviation in the flow of cooling water can be avoided. The lower peak of each downward protruding portion 13 is curved in profile, taking the flow resistance of water into account.

The upward protruding portions 11 are defined with four holes 12 for flowing water assuming a sector contour in a vertically projected shadow zone from the fuel rod above. On the other hand, the downward protruding portions 13 are defined therein with a crisscross hole 14 for flowing water in a vertically projected shadow zone from the crossing corner area of the grid cell walls 3a.

Figure 5:
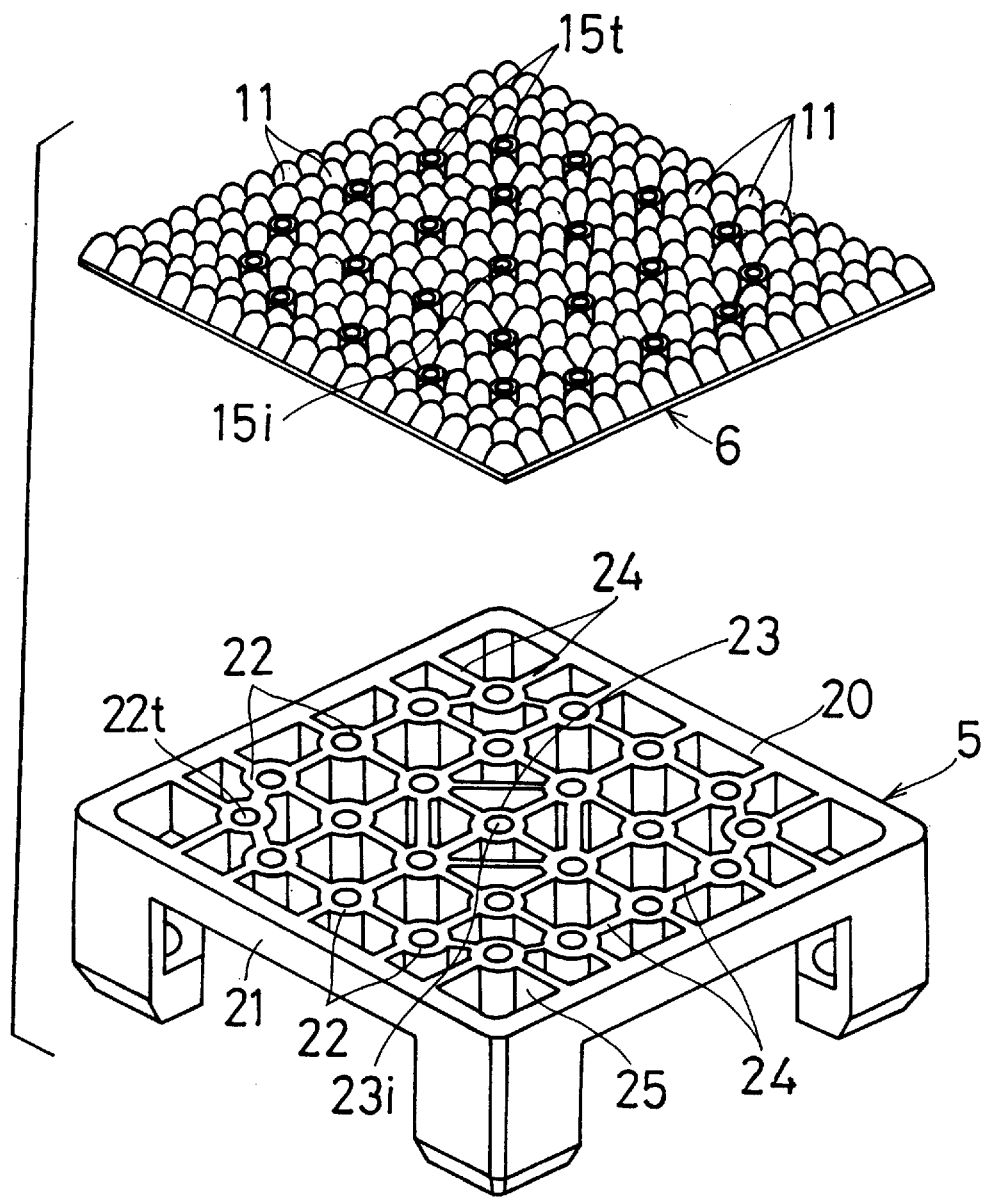
FIG. 5 is a diagrammatic perspective view showing the bottom nozzle and the filter member in the embodiment of FIG. 1.

A further preferred embodiment is that the bottom nozzle 5 is constructed, as illustrated in FIG. 5, as a low-pressure boss type plate body 20 composed of bosses 22 for insertion of the thimble tubes 2 in holes 22t thereof and a central boss 23 for insertion of the instrumentation tube 2 in a hole 23i thereof, and ribs 24 interconnecting both bosses 22,23. The openings 25 delimited by the bosses 22,23, the ribs 24 and an outer frame 21 of the plate body 20 serve as through-holes through which to route flowing water from a lower core plate.

The outer frame 21 is formed at its inner side 21a with a slanted face tapering in thickness toward its lower part as indicated in FIG. 3 so that foreign matters may not flow easily into gaps between fuel assemblies. The ribs 24 are formed as a roundish streamlined element having a thin-gauge lower part so as to reduce the flowing-water resistance, as will be apparent from FIG. 3.

Referring to FIG. 5, the filter member 6 of this invention is likewise defined with holes 15t for receiving therein the thimble tubes 2 and a hole 15i for receiving therein the instrumentation guide tube 2, both the holes 15t and 15i being in register with the holes 22t, 23i of the bosses 22, 23 of the subjacent bottom nozzle plate 20. The filter member 6 is installed to cover the overall upper face of the bottom nozzle plate 20.

Figure 6:
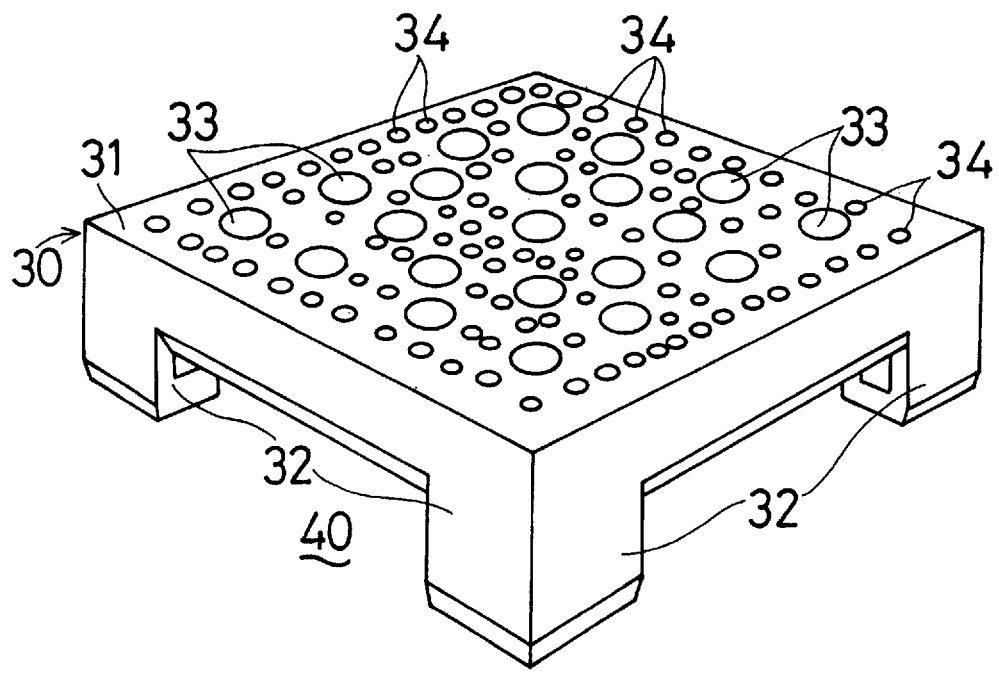
FIG. 6 is a perspective view showing a prior art bottom nozzle.

As regards the conventional bottom nozzle shown in FIG. 6 wherein the diameter of flowing-water hole is made small, the flow passage area is about 30 percent the surface area of the bottom nozzle plate 30. The projected shadow area of the flow passage over the lower core plate 30, which is a factor affecting materially the intrusion of forein matters, is also ca. 30% the total projected shadow area of the bottom nozzle.

In contradistinction, the bottom nozzle fitted with the filter member according to this invention enables to make the projected shadow area of the through-holes for flowing water 12, 14 over the lower core plate nearly zero, by availing itself of the steric construction of the upward and downward protruding portions 11, 13 and at the same time by superposing the adjacent fuel rods 1 and the lowermost grid 3' the through-holes 12,14 in the upper and lower position relation. Further by controlling the posture of foreign matters under flow, it is also possible to improve significantly the impeding effect even to fine or small foreign matters.

Stated another way, the projected area of the through-holes as seen from underside of the fuel assembly can be minimized by the installation of the filter member 6 as described above at the downstream side of the bottom nozzle plate 20, and further the posture of any foreign objects intruded in the flow passage can be controlled owing to the steric construction of the filter member, as a result of which it is possible to avoid the intrusion of linear foreign objects into the fuel assembly, which was hitherto impossible, and eventually it is possible to prevent damage or failure to the fuel rods.

Moreover, despite the fact that the projected area of the through-holes to foreign matters in the flowing water is approximately zero, the configuration of the filter member by the arrangement of the protuberances 11,13 in both vertical directions and the formation of the through-holes 12,14 in the protuberances 11,13 enable to avail themselves of side walls of the protuberances 11,13 thereby to make the opening area of the through-holes 12,14 large. As a consequence, the passage area of the bottom nozzle is made much larger than that of the prior art bottom nozzle, without any increase in the pressure loss.

The fabrication method for the filter member 6 includes, for example, a method of press working to a single grid sheet, a precision casting method, a powder metallurgy method, a soldering and welding method, etc., but it is possible to choose any suitable method for an intended configuration of the filter member. The filter member is made of a metal material selected from the viewpoint of intensity, corrosion resistance, and the like.

The installation of the filter member 6 to the bottom nozzle 5 is conducted, for example, by an anchoring technique of the filter member to the legs by welding or the like as well as by a mechanical fastening technique of the filter member to the outer frame 21 of the bottom nozzle 5, such as screw fastening, rivet fastening and the like. In installing, the filter member can be fitted to the bottom nozzle at its downstream side, without obstructing the thimble tubes from being fixed to the bottom nozzle plate at its lower face.

What is claimed is:

1. A nuclear fuel assembly designed for use in a pressurized water reactor comprising a top nozzle and a bottom nozzle vertically spaced apart from each other; grids, axially spaced apart from one another, for supporting a fuel cluster in cells thereof in a transversely spaced relation;

a plurality of nuclear fuel rods loaded in the cells of grids to extend between the top nozzle and a lowermost grid; and thimble tubes and an instrumentation tube disposed at specified locations of the grid cells and interconnecting rigidly the top and bottom nozzles, thus constituting the fuel cluster; and a filter member of a thin-gauge profiled hollow sheet interposed between the bottom nozzle and the lowermost grid in a manner abutting to the lowermost grid, wherein said filter member is configured to have a plurality of upward protruding portions having peaks extending up to the lowermost grid and a plurality of downward protruding portions having peaks extending downwardly to the subjacent bottom nozzle, the upward protruding portions and the downward protruding portions being arranged alternately in sequence relative to diagonal line directions of the filter member so that the upward protruding portions may be located below the fuel rods and the downward protruding portions may be located below a crossing corner area of walls of the grid cells, the upward protruding portions each defining therein four through-holes for flowing water in a vertically projected shadow zone of the fuel rod, thus assuming a curved crisscross contour;

the downward protruding portions each defining, in a vertically projected shadow zone of the crossing corner area of the grid cell walls, such a through-hole for flowing water that assumes a curved crisscross contour.

2. The fuel assembly for a pressurized water reactor as set forth in claim 1, wherein said upward protruding portions of the filter member are each configured in a rotation symmetrical form relative to a central axis of each fuel rod above the member and have an outside diameter substantially equal to that of the fuel rod.

3. The fuel assembly for a pressurized water reactor as set forth in claim 1, wherein said bottom nozzle is of a plate body having a low pressure loss composed of an outer frame, a plurality of bosses for the insertion of the thimble tubes therein and a central boss for the insertion of the instrumentation tube therein, and ribs interconnecting both the bosses, thus delimiting openings, surrounded by the outer frame, bosses and ribs, through which to route flowing water.

4. The fuel assembly for a pressurized water reactor as set forth in claim 2, wherein said bottom nozzle is of a plate body having a low pressure loss composed of an outer frame, a plurality of bosses for the insertion of the thimble tubes therein and a central boss for the insertion of the instrumentation tube therein, and ribs interconnecting both the bosses, thus delimiting openings, surrounded by the outer frame, bosses and ribs, through which to route flowing water.

5. The fuel assembly for a pressurized water reactor as set forth in claim 3, wherein said outer frame of the bottom nozzle has an inside slanted face diminishing in thickness toward its lower part.

6. The fuel assembly for a pressurized water reactor as set forth in claim 2, wherein said filter member is configured to have such upward and downward protruding portions that assume a curved contour of a sinusoidal cross-section as taken vertically along the diagonal line directions of the filter member.

7. A nuclear fuel assembly designed for use in a pressurized water reactor comprising a top nozzle and a bottom nozzle verticlaly spaced apart from each other; grids, axially spaced apart from one another, for supporting a fuel cluster in cells thereof in a transversely spaced relation;

a plurality of nuclear fuel rods loaded in the cells of grids to extend between the top nozzle and a lowermost grid; and thimble tubes and an instrumentation tube disposed at specified locations of the grid cells and interposed rigidly between the top and bottom nozzles, thus constituting the fuel cluster; and a filter member of a thin-gauge profiled hollow sheet interposed between the bottom nozzle and the lowermost grid in a manner abutting to the lowermost grid, wherein said filter member is configured to have generally conical upward protruding portions and generally conical downward protruding portions arranged alternately in sequence relative to diagonal directions of the filter member, the upward and downward protruding portions being defined therein with respective through-holes for flowing water in such locations and contours that a total projected shadow area of all the through-holes of both portions over a lower core plate to be located below the fuel assembly is substantially naught.

* * * * *